United States Patent
Lee

(10) Patent No.: US 9,578,581 B2
(45) Date of Patent: *Feb. 21, 2017

(54) METHOD FOR EFFICIENTLY PERFORMING INTERRAT HANDOVER IN A RADIO ACCESS SYSTEM

(71) Applicant: LG Electronics Inc., Seoul (KR)

(72) Inventor: Songgun Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,953

(22) Filed: Dec. 21, 2015

(65) Prior Publication Data

US 2016/0112926 A1    Apr. 21, 2016

Related U.S. Application Data

(63) Continuation of application No. 14/113,873, filed as application No. PCT/KR2012/003185 on Apr. 25, 2012, now Pat. No. 9,237,486.

(30) Foreign Application Priority Data

Apr. 25, 2011    (KR) .................. 10-2011-0038261

(51) Int. Cl.
*H04W 4/00*    (2009.01)
*H04W 36/30*    (2009.01)
(Continued)

(52) U.S. Cl.
CPC ....... *H04W 36/30* (2013.01); *H04W 36/0022* (2013.01); *H04W 36/0083* (2013.01); *H04W 36/14* (2013.01); *H04W 36/36* (2013.01)

(58) Field of Classification Search
None
See application file for complete search history.

(56) References Cited

U.S. PATENT DOCUMENTS

2010/0093350 A1*    4/2010    Wang ............... H04J 11/0093
                                               455/436
2010/0208699 A1    8/2010    Lee et al.

FOREIGN PATENT DOCUMENTS

KR    10-2008-0025922 A    3/2008
KR    10-2010-0093344 A    8/2010
KR    10-2010-0114345 A    10/2010

OTHER PUBLICATIONS

User Equipment (UE) procedures in idle mode, 3GPP TS 36.304 V9.2.0. Mar. 2010.*

(Continued)

*Primary Examiner* — Yemane Mesfin
*Assistant Examiner* — Jeff Banthrongsack
(74) *Attorney, Agent, or Firm* — Morgan, Lewis & Bockius LLP

(57) ABSTRACT

The present invention relates to a radio access system, and more particularly, to a method for efficiently performing handover in circumstances in which two networks use different communication methods, and to an apparatus using the method. According to one embodiment of the present invention, a method for performing handover in a first type of cell by a terminal supporting an inter-radio access technology (interRAT) handover (HO) comprises the steps of: searching for cells of a second type that are operating in accordance with a communication type different from that of said first type of cell; receiving a minimal reception signal quality value and signal quality offset information from a second type of base station which is found in step 1; determining whether or not the said found second type of base station is available for service based on a signal quality measurement value, a power compensation value, and said minimal reception signal quality value and signal quality offset information of said found second type of base station;

(Continued)

and performing handover to said second type of base station when the latter is determined to be available for service.

8 Claims, 5 Drawing Sheets

(51) Int. Cl.
   *H04W 36/00*     (2009.01)
   *H04W 36/14*     (2009.01)
   *H04W 36/36*     (2009.01)

(56) References Cited

OTHER PUBLICATIONS

Andreas Roessler, Bridging the gap between LTE and 1Xev-DO LTE-to-HRPD handover, Mar. 2010.*
Roessler, "Bridging the gap between LTE and 1xEV-DO LTE-to-HRPD handover—A key element in LTE development," Rohde &Schwarz, Mar. 2010.
Written Opinion and International Search Report issued in corresponding International Patent Application No. PCT/KR2012/003185 dated Nov. 28, 2012.
"3rd Generation Partnership Project; Technical Specification Group Radio Access Network; Evolved Universal Terrestrial Radio Access (E-UTRA); User Equipment (UE) procedures in idle mode (Release 9)," 3GPP TS 36.304 V9.2.0. Mar. 2010.

* cited by examiner (a) Control-plane protocol stack (b) User-plane protocol stack

METHOD FOR EFFICIENTLY PERFORMING INTERRAT HANDOVER IN A RADIO ACCESS SYSTEM

CROSS REFERENCE TO RELATED APPLICATIONS

The present application is a continuation of U.S. patent application Ser. No. 14/113,873, filed on Oct. 25, 2013, the entire disclosure of which is hereby incorporated by reference for all purposes as if fully set forth herein. U.S. patent application Ser. No. 14/113,873 is a U.S. National Stage Entry of PCT International Application No. PCT/KR2012/003185, filed on Apr. 25, 2012, and claims the benefit of Korean Patent Application No. 10-2011-0038261, filed on Apr. 25, 2011.

FIELD OF THE INVENTION

The present invention relates to a radio access system, and more particularly to a method and apparatus for performing efficient handover when two networks having different communication schemes coexist.

BACKGROUND ART

A dual-mode mobile terminal is a mobile terminal capable of supporting two radio technologies having different communication schemes, and is mainly used in a region in which heterogeneous communication networks coexist. As a representative example of the dual-mode mobile terminal, many developers and companies are conducting intensive research into mobile terminals configured to use not only Long Term Evolution (LTE)-based wireless communication but also Code Divisional Multiple Access (CDMA)-based wireless communication. An enhanced High-Rate Packet Data (eHRPD) scheme may be used as a representative example of CDMA. The eHRPD is a new version of the 1×EV-DO upper layer protocol stack developed by the 3GPP2 standards committee so as to enable wireless communication network interoperability for LTE.

Although a dual-mode terminal capable of communicating with the LTE network and the eHRPD network according to the present invention will hereinafter be disclosed as an example for convenience of description and better understanding of the present invention, it is obvious to those skilled in the art that other wireless communication schemes can also be applied to the present invention without difficulty.

If a user equipment (UE) supports two different communication schemes, the UE may prefer to receive services through a high radio technology from the viewpoint of a general communication enterprise. That is, assuming that the UE supports the LTE scheme and the eHRPD scheme, the UE may prefer to receive a necessary service through the LTE network. However, service coverage of the eHRPD network is larger than that of the LTE network at an initial service step in which switching from the legacy eHRPD network to the LTE network begins. In the initial service step in which switching from the legacy eHRPD network to the LTE network begins, the service coverage of the eHRPD network is larger than that of the LTE network. If the UE is located at a coverage boundary of the LTE network under the above-mentioned situation, the UE may be handed over to the eHRPD network by a network configured handover condition. On the contrary, if the UE receives a necessary service through the eHRPD network, the UE periodically searches for an LTE cell. Then, the UE having searched for the LTE cell may attempt to immediately access the LTE cell without network control. In this case, if the UE is located at an area with poor coverage, such as a cell edge of the LTE cell or a shaded region, the UE again determines the network configured handover (HO) condition. If the network configured handover (HO) condition is satisfied, the UE is handed over to the eHRPD network. The above-mentioned phenomenon (i.e., ping pong phenomenon) may repeatedly occur in so far as the UE stays in a specific region in which the corresponding condition is satisfied.

The above-mentioned problem is based on the fact that a first condition in which the UE performs handover from the LTE network to the eHRPD network is different from a second condition in which the UE performs handover from the eHRPD network to the LTE network. Accordingly, the present invention defines a handover (HO) execution condition capable of solving the above problem, and proposes a method and apparatus for performing efficient handover on the basis of the defined HO execution condition.

DETAILED DESCRIPTION OF THE INVENTION

Technical Problem

An object of the present invention is to provide a method and apparatus for allowing a dual-mode UE to efficiently perform a handover (HO) under the situations including two or more heterogeneous networks.

Another object of the present invention is to provide a method and apparatus for minimizing the number of operations in which the UE is repeatedly handed over between the LTE network and the eHRPD network under the situation including the LTE network and the eHRPD network.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing handover in a first-type cell by a user equipment (UE) supporting an inter Radio Access Technology (interRAT) handover (HO) in a radio access system including: searching for a second-type cell configured to use a communication scheme different from that of the first-type cell; receiving a minimum reception (Rx) signal quality value and signal quality offset information from the searched second-type base station (BS); determining whether or not a service from the searched second-type BS is available in consideration of a signal quality measurement value, a power compensation value, the minimum Rx signal quality value, and the signal quality offset information of the searched second-type BS; and performing handover (HO) to the searched second-type BS, if the service from the searched second-type BS is available.

The signal quality offset information may include first offset information and second offset information, wherein the first offset information is an offset for correcting the minimum Rx signal quality value, and the second offset information is applied only to the InterRAT handover (HO) from the first-type cell to the second-type cell.

The determining step may include: determining that the service from the second-type BS is available, if a specific value obtained when the minimum Rx signal quality value, the power compensation value, the first offset information, and the second offset information are subtracted from the signal quality measurement value.

The second offset information may be calculated in the second-type cell by subtracting a hysteresis value and the minimum Rx signal quality value from a threshold value predetermined for an event of handover from the second-type cell to the first-type cell.

The signal quality offset information and the minimum Rx signal quality value may be contained in System Information Block Type 1 (SystemInformationBlockType1), and then received.

The first-type cell may be an enhanced High-Rate Packet Data (eHRPD) cell, and the second-type cell may be a Long Term Evolution (LTE) cell.

In accordance with another aspect of the present invention, a method for supporting handover (HO) of a user equipment (UE) supporting an inter Radio Access Technology (interRAT) handover (HO) from a first-type cell to a second-type cell in a radio access system includes: in the second-type cell, determining signal quality offset information applied to a handover (HO) event from the second-type cell to the first-type cell; and transmitting the signal quality offset information and a minimum reception (Rx) signal quality value to the user equipment (UE).

The determining step may be performed by subtracting a hysteresis value and the minimum Rx signal quality value from a predetermined threshold value.

The signal quality offset information and the minimum Rx signal quality value may be contained in System Information Block Type 1 (SystemInformationBlockType1), and then transmitted.

The first-type cell may be an enhanced High-Rate Packet Data (eHRPD) cell, and the second-type cell may be a Long Term Evolution (LTE) cell.

In accordance with another aspect of the present invention, a user equipment (UE) for supporting an inter Radio Access Technology (interRAT) handover (HO) in a radio access system includes: a processor; and a radio frequency (RF) module configured to transmit and receive an RF signal to and from an external part upon receiving a control signal from the processor, wherein the processor searches for, in the first-type cell, a second-type cell configured to use a communication scheme different from that of the first-type cell; upon receiving a minimum reception (Rx) signal quality value and signal quality offset information from the searched second-type base station (BS), determines whether or not a service from the searched second-type BS is available in consideration of a signal quality measurement value, a power compensation value, the minimum Rx signal quality value, and the signal quality offset information of the searched second-type BS; and performs handover (HO) to the searched second-type BS when the service from the searched second-type BS is available.

The signal quality offset information may include first offset information and second offset information, wherein the first offset information is an offset for correcting the minimum Rx signal quality value, and the second offset information is applied only to the InterRAT handover (HO) from the first-type cell to the second-type cell.

The processor may determine that the service is available, if a specific value obtained when the minimum Rx signal quality value, the power compensation value, the first offset information, and the second offset information are subtracted from the signal quality measurement value.

The second offset information may be calculated in the second-type cell by subtracting a hysteresis value and the minimum Rx signal quality value from a threshold value predetermined for an event of handover from the second-type cell to the first-type cell.

The signal quality offset information and the minimum Rx signal quality value may be contained in System Information Block Type 1 (SystemInformationBlockType1), and then received.

The first-type cell may be an enhanced High-Rate Packet Data (eHRPD) cell, and the second-type cell may be a Long Term Evolution (LTE) cell.

Effects of the Invention

As is apparent from the above description, exemplary embodiments of the present invention have the following effects.

First, the embodiments of the present invention can more efficiently define an inter-RAT handover condition.

Second, the embodiments of the present invention can reduce the number of operations in which the UE repeatedly moves between the LTE network and the eHRPD network in an LTE weak-electric-field region, resulting in reduction of unnecessary UE throughput deterioration.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include a Node B (Node-B), an eNode B (eNB), a BS and the like.

Figure 1:
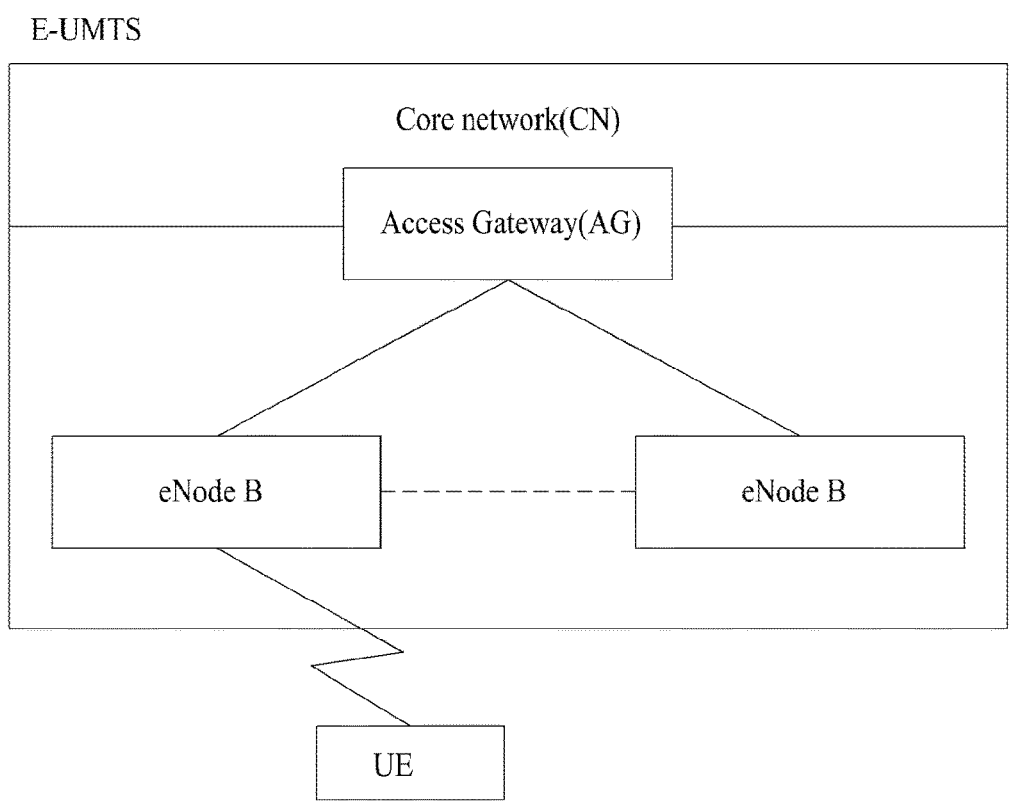
FIG. 1 is a conceptual diagram illustrating an Evolved Universal Mobile Telecommunications System (E-UMTS) network structure.

FIG. 1 is a conceptual diagram illustrating an Evolved Universal Mobile Telecommunications System (E-UMTS) network structure.

The Enhanced Universal Mobile Telecommunication Systems (E-UMTS) system has evolved from a legacy WCDMA UMTS system, and basic standardization thereof is now being conducted by the 3rd Generation Partnership Project (3GPP). The E-UMTS system may also be called a Long Term Evolution (LTE) system. For details of the technical specifications of the UMTS and E-UMTS systems, refer to Release 7 and Release 8 of "3rd Generation Partnership Project; Technical Specification Group Radio Access Network".

Referring to FIG. 1, the E-UMTS system largely includes a User Equipment (UE), a base station (or eNB), and an Access Gateway (AG) which is located at an end of a network (E-UTRAN) and is connected to an external network. Generally, the BS (or eNB) can simultaneously transmit multiple data streams for a broadcast service, a multicast service and/or a unicast service. The AG may be divided into a part that handles processing of user traffic and a part that handles control traffic. Here, the AG part for processing new user traffic and the AG part for processing control traffic can communicate with each other using a new interface. One BS (or one eNB) may include one or more cells. An interface for transmission of user traffic or control traffic may be located between eNBs. A core network (CN) may include the AG and a network node or the like for user registration of the UE. An interface for discriminating between the E-UTRAN and the CN may be used. The AG manages mobility of a UE on a Tracking Area (TA) basis. The TA includes a plurality of cells. When the UE has moved from a specific TA to another TA, the UE notifies the AG that the TA where the UE is located has changed.

Figure 2:
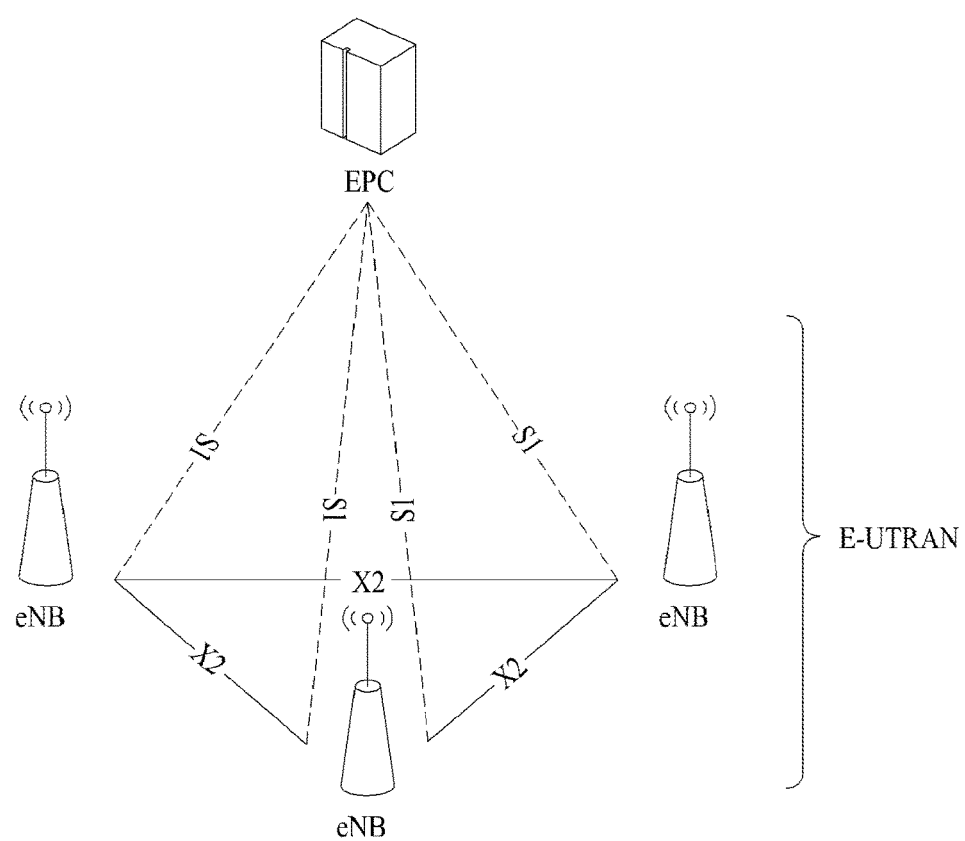
FIG. 2 is a conceptual diagram illustrating an E-UTRAN network structure.

FIG. 2 illustrates a network structure of an Evolved Universal Terrestrial Radio Access Network (E-UTRAN) system which is a mobile communication system to which the embodiment of the present invention is applied.

The E-UTRAN system is an evolved version of the conventional UTRAN system. The E-UTRAN includes one or more eNBs, and the eNBs are interconnected through an X2 interface. The X2 user plane interface (X2-U) is defined between the eNBs. The X2-U interface provides non-guaranteed delivery of user plane Packet Data Units (PDUs). The X2 control plane interface (X2-CP) is defined between two neighbour eNBs. The X2-CP performs the following functions: context transfer between eNBs, control of user plane tunnels between a source eNB and a target eNB, transfer of handover-related messages, uplink load management and the like. Each eNB is connected to UEs through a radio interface and is connected to an Evolved Packet Core (EPC) through an S1 interface. The planar S1 user plane interface (S1-U) is defined between the eNB and the S-GW. The S1-U interface provides non-guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signalling Transport function, Network Sharing Function, MME Load balancing Function and the like.

Figure 3:
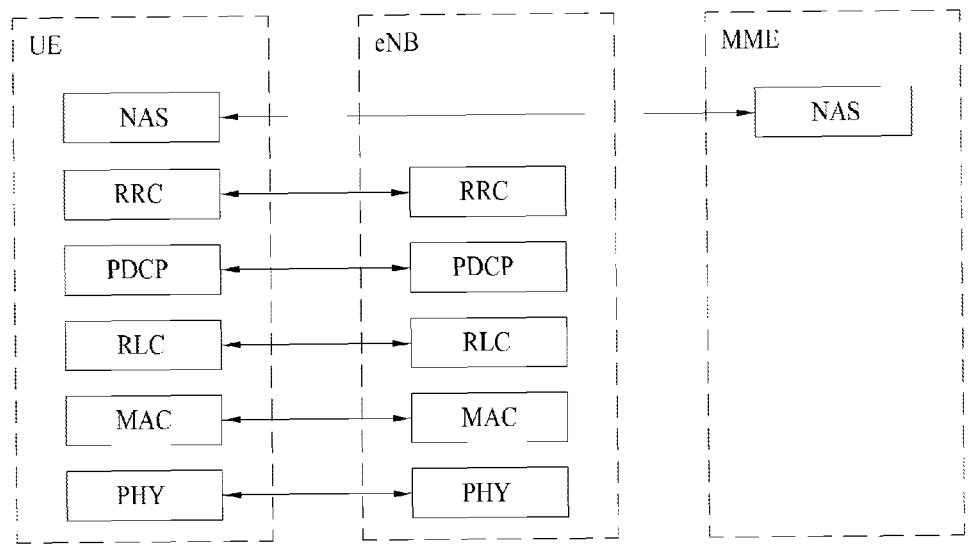
FIG. 3 illustrates a control plane and a user plane (U-Plane) of a radio interface protocol between a User Equipment (UE) and an E-UTRAN according to the 3GPP wireless access network standard.
Figure 3:
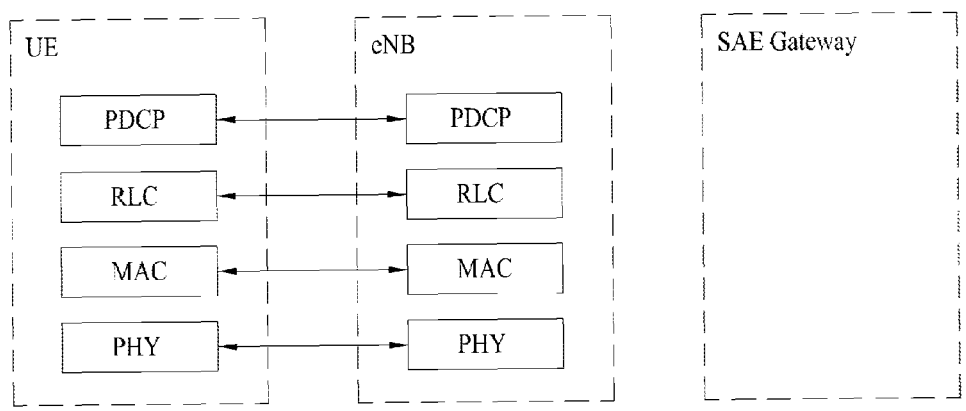

FIG. 3 illustrates a control plane and a user plane (U-Plane) of a radio interface protocol between a User Equipment (UE) and an E-UTRAN according to the 3GPP wireless access network standard.

The radio interface protocol is divided horizontally into a physical layer, a data link layer and a network layer, and vertically into a user plane for data transmission and a control plane for signaling. The protocol layer of FIG. 2 can be divided into an L1 layer (first layer), an L2 layer (second layer) and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer enables reliable data transmission. The functions of the RLC layer may also be implemented through internal functional blocks of the MAC layer. In this case, the RLC layer need not exist. A Packet Data Convergence Protocol (PDCP) layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink Multicast Channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

A method for determining a handover (HO) by a general dual-mode UE supporting the LTE network and the eHRPD network under the situation in which two networks coexist according to the present invention will hereinafter be described in detail.

First, the condition for performing handover from the eHRPD network to the LTE network will hereinafter be described in detail.

While the UE receives a necessary service through the eHRPD network, the UE periodically searches for the LTE cell. If the LTE cell is detected, the UE determines whether or not a necessary service can be applied to the detected cell. If a service possible state of the corresponding LTE cell is determined, the UE performs handover (HO). The rule for determining whether or not the service for the detected LTE cell is available is represented by the following equation 1.

$$Qrxlevmeas > Qrxlevmin + Pcompensation \quad [\text{Equation 1}]$$

In Equation 1, Qrxlevmeas is a measured cell RX level value of the detected cell, and a reception (RX) level is a Reference Signal Received Power (RSRP) denoted on a dBm basis. In addition, Qrxlevmin is a minimum Rx level value requisite for the cell, and may be denoted by an RSRP value. Pcompensation is a power compensation constant.

That is, if the RSRP measurement value of the detected cell is higher than a total sum of the minimum requirement value and the constant, the UE determines that a service is available within the detected cell.

A condition for performing handover from the LTE network to the eHRPD network will hereinafter be described in detail.

Handover from the LTE network to the eHRPD network is determined according to which one of an A2 event and a B2 event will be used by the network. For example, in the case of the A2 event, handover (HO) is triggered, when a signal quality of the serving LTE cell is lower than a reference quality as defined in the 3GPP standard. In the case of the B2 event, handover (HO) is triggered, when a signal quality of the LTE serving cell is less than a reference quality and at the same time a signal quality of a neighbor heterogeneous network (i.e., eHRPD network) is higher than those of other reference values. In conclusion, if the signal quality of the LTE serving cell is lower than a specific threshold value in the network to which the A2 or B2 event is applied, the UE is handed over to the eHRPD network.

In the case of using an RSRP as an event trigger condition, a reference for determining whether or not a signal quality of the LTE serving cell is lower than a specific threshold value is represented by the following equation 2.

$$Qrxlevmeas > Threshold + Hysteresis \quad [\text{Equation 2}]$$

In Equation 2, Qrxlevmeas is a UE-measured Rx signal quality level of the LTE network, Threshold is a predetermined threshold value, and Hysteresis is a Hysteresis value. The above-mentioned Qrxlevmeas, Threshold, and Hysteresis values are transferred to the UE through LTE network signaling. If the above Equation 2 is satisfied, the UE transmits a measurement report message to the LTE network, and the LTE network transmits a handover command message in such a manner that the UE can move to the eHRPD network.

However, assuming that the UE simultaneously satisfies Equation 1 and Equation 2, the UE is repeatedly handed over between the LTE network and the eHRPD network. The following parameters show configuration values by which repeated handover (i.e., ping pong) is carried out between the LTE network and the eHRPD network, and the following parameters can be applied to the actual USA (United States of America) Verizon network.

Qrxlevmin: −120 dBm,
Threshold: −100 dBm,
Hysteresis: 3 dBm,
Pcompensation: 0,
TriggerQuantity: RSRP,
InterRAT handover event: A2

Accordingly, assuming that an RSRP of the UE is worse than −103 dBm (See Equation 2) and is better than −120 dBm (See Equation 1) (i.e., if the UE belongs to the LTE weak electric field), the UE is repeatedly handed over between the eHRPD network and the LTE network.

However, when the UE searches for the LTE cell according to the 3GPP standard, the UE uses a high quality PLMN concept. According to the high quality PLMN concept, if the RSRP value of the LTE cell is higher than −110 dBm, the corresponding cell is considered a high quality cell. Although the high quality PLMN concept is introduced into the present invention, repeated handover still occurs in a specific region corresponding to "−103 dBm>RSRP>−110 dBm".

The above-mentioned problem occurs because a first condition in which the UE performs handover from the LTE network to the eHRPD network is different from a second condition in which the UE performs handover from the eHRPD network to the LTE network. Accordingly, the present invention defines a handover (HO) execution condition capable of solving the above-mentioned problem, and proposes a method and apparatus for performing efficient handover on the basis of the defined HO execution condition. In more detail, one of the first condition in which the UE performs handover from the LTE network to the eHRPD network and the second condition in which the UE performs handover from the eHRPD network to the LTE network is emphasized to reduce the ping-pong phenomenon. However, if the first condition for handover from the LTE network to the eHRPD network is more emphasized, there is a high possibility of sudden service interruption, such that it is more preferable that the condition for handover from the eHRPD network to the LTE network be more emphasized. In other words, although the UE receives a necessary service through the eHRPD network, if a signal quality of the LTE network is poor, it is more preferable that the UE be located in the eHRPD network. The emphasized condition can be implemented by a method for modifying information received by the UE through the LTE network.

For example, when searching for the LTE cell in the eHRPD network, the UE may calculate the above condition (shown in Equation 1) in which the UE performs handover from the eHRPD network to the LTE network upon receiving a Master Information Block (MIB) and System Information Block (SIB) Type 1 (Type1) from the LTE network. Accordingly, "q-RxLevminOffsetInterRAT" information is inserted into SIB Type1. One example of the encoded result of the SIB Type1 in which "q-RxLevminOffsetInterRAT" information is inserted is shown in the following Table 1.

$$RxLevminOffsetInterRAT = Threshold - Hysteresis - Qrxlevmin \quad \text{[Equation 4]}$$

In Equation 4, Threshold may denote a specific value obtained when a legacy threshold value is subtracted from 'a2' in case of the A2 event, or may denote another value obtained when Threshold1 is subtracted from 'b2' in case of the B2 event.

A detailed description of the A2 and B2 events is as follows.

The A2 event indicates that a signal quality of the serving cell is less than a threshold value. In more detail, the A2 event may indicate the case of "Ms+Hys<Thresh", where Ms is a signal measurement result of the serving cell to which no offset is applied, and Hys is a hysteresis parameter (defined in 'reportConfigEUTRA') for the A2event. In addition, Thresh is a threshold parameter (i.e., a2-Threshold defined in reportConfigEUTRA) for the A2 event.

The B2 event indicates that a signal quality of the serving cell is worse than a Threshold 1 (threshold1) and a signal quality of a neighbor heterogeneous cell is superior to a Threshold 2 (threshold2). In more detail, the B2 event

TABLE 1

```
SystemInformationBlockType1 ::=  SEQUENCE {
  cellAccessRelatedInfo          SEQUENCE {
     plmn- IdentityList               PLMN- IdentityList,
     trackingAreaCode                 TrackingAreaCode,
     cellIdentity                     CellIdentity,
     cellBarred                       ENUMERATED { barred, notBarred},
     intraFreqReselection             ENUMERATED { allowed, notAllowed},
     csg- Indication                  BOOLEAN,
     csg- Identity                    BIT STRING (SIZE (27)) OPTIONAL - - Need OR
  },
  cellSelectionInfo              SEQUENCE {
     q- RxLevMin                      Q- RxLevMin,
     q- RxLevMinOffset                   INTEGER (1..8)        OPTIONAL   - - Need OP
     q- RxLevminOffsetInterRAT        RSRP- Range            OPTIONAL - - Need OP
  },
  p- Max                         P- Max                 OPTIONAL,      - - Need OP
  freqBandIndicator              INTEGER (1..64),
  schedulingInfoList             SchedulingInfoList,
  tdd- Config                    TDD- Contig            OPTIONAL, - - Cond TDD
  si- WindowLength               ENUMERATED {
                                    ms1, ms2, ms5, ms10, ms15, ms20,
                                    ms40},
  systemInfoValueTag             INTEGER (0..31),
  nonCriticalExtension           SEQUENCE { }           OPTIONAL - - Need OP
}
```

Referring to Table 1, Qrxlevmin(q–RxLevMin) information, QrxlevminOffset(q–RxLevMinOffset) information, and RxlevminOffsetInterRAT(q–RxLevminOffsetInterRAT) information may be contained in "cellSelectionInfo" information. The QrxlevminOffset information may denote offset information applied to "Qrxlevmin", and the RxLevMinOffsetInterRAT information may denote an offset value for emphasizing the condition in which the UE performs handover from the eHRPD network to the LTE network. Accordingly, Equation 1 showing the above condition in which the UE performs handover from the eHRPD network to the LTE network is changed to Equation 3. In Equation 3, it is assumed that QrxlevminOffset is set to zero (0).

$$Qrxlevmeas > Qrxlevmin + RxLeminOffsetInterRAT + Pcompensation \quad \text{[Equation 3]}$$

However, if the UE uses the A2 or B2 event as the condition in which the UE performs handover from the LTE network to the eHRPD network, the LTE network may determine the RxLevminOffsetInterRAT value as shown in the following equation 4 in consideration of Equation 2.

indicates the case of "Ms+Hys<Thresh1 and Mn+Ofn–Hys>Thresh2", where Ms is identical to that of the A2 event and Hys may denote a hysteresis parameter (defined in 'reportConfigInterRAT') for the B2 event. Mn may denote a signal quality of a neighbor heterogeneous cell to which no offset is applied, and Ofn may denote a frequency-specified offset (i.e., 'offsetFreq' defined in 'measObject' corresponding to a frequency of the neighbor heterogeneous cell) of a frequency of the neighbor heterogeneous cell. Thresh1 may denote 'b2-Threshold1' defined in 'reportConfigInterRAT' for the B2 event, and Thresh2 may denote 'b2–Threshold2' defined in 'reportConfigInterRAT' for the B2 event.

Meanwhile, a detailed description of the above-mentioned events may refer to 3GPP TS36.331 (RRC).

In conclusion, the handover (HO) condition in which the UE performs handover (HO) from the eHPRD network to the LTE network may be represented by the following equation 5 by substituting Equation 4 into Equation 3.

$$Qrxlevmeas > Threshold - Hysteresis - Pcompensation \quad \text{[Equation 5]}$$

In comparison between Equation 5 and Equation 2, a specific value corresponding to the Pcompensation value may be used as a value of causing the ping-pong phenomenon. Pcompensation may be represented by the following equation 6.

$$\text{Pcompensation}=\max(P_{EMAX\_H}-P_{PowerClass}, 0)\ (\text{dB}) \quad \text{[Equation 6]}$$

In Equation 6, $P_{EMAX\_H}$ may denote a maximum Tx power level applied to the case in which the UE performs UL transmission within the corresponding cell, and $P_{PowerClass}$ is a maximum radio output power dependent upon a UE power class. In this case, $P_{PowerClass}$ is a UE-specified value unknown to the LTE network, and the LTE network is unable to recognize the Pcompensation value. However, Pcompensation may be set to a negligible low value or zero '0'. In conclusion, the RxLevminOffsetInterRAT value determined in the LTE network as shown in Equation 4 is used as a reference for deciding handover (HO) from the eHPRD network to the LTE network, such that the number of ping-pong actions is minimized.

The above-mentioned HO decision procedure will hereinafter be described with reference to FIG. 4.

Figure 4:
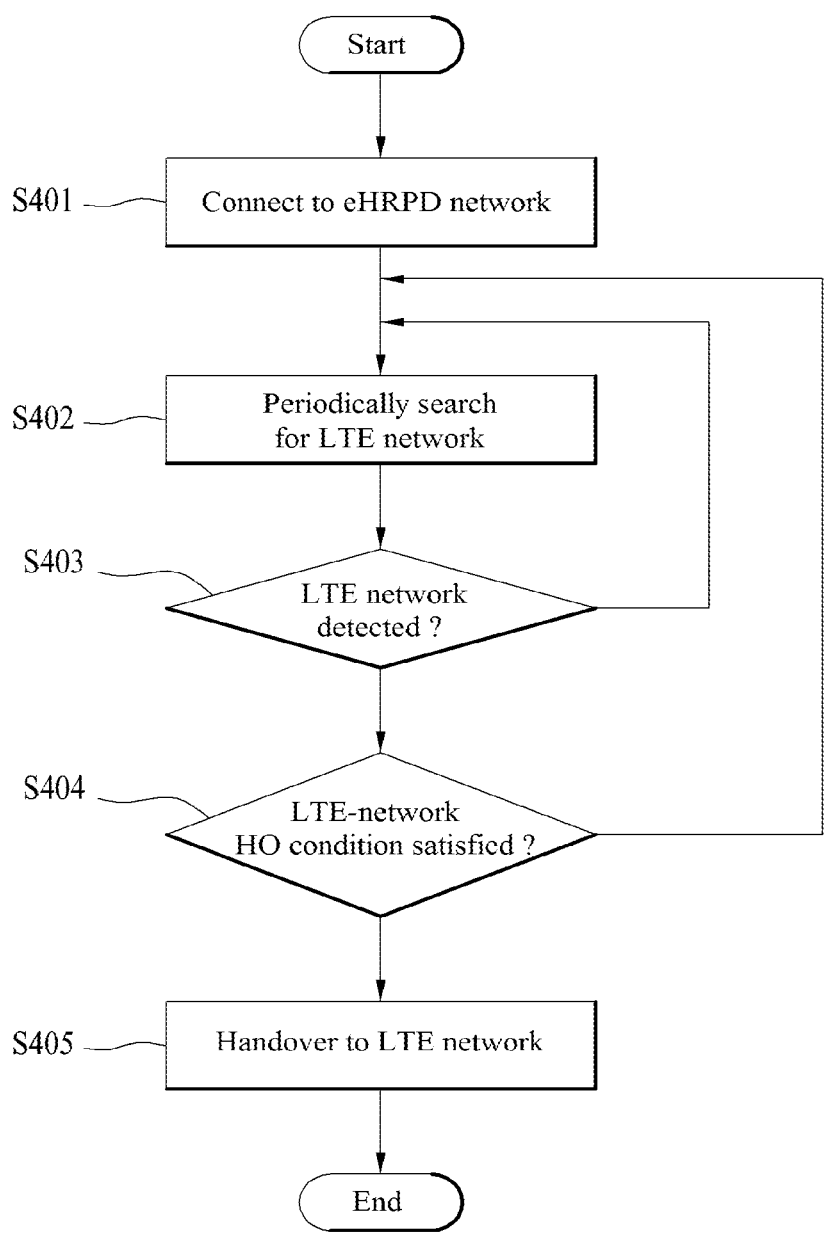
FIG. 4 is a flowchart illustrating a method for determining a UE handover between the LTE network and the eHRPD network according to an embodiment of the present invention.

FIG. 4 is a flowchart illustrating a method for determining a UE handover between the LTE network and the eHRPD network according to an embodiment of the present invention.

Referring to FIG. 4, the UE is connected to the eHRPD network such that the UE receives a necessary service in step S401.

While receiving the service through the eHPRD network, the UE searches for a neighbor LTE network so as to periodically select a cell in step S402. If the LTE network is detected in step S403, the UE receives MIB and SIBtype1 from the LTE network so as to obtain the RxLevminOffsetInterRAT value, and determines whether or not the condition of Equation 3 is satisfied in step S404.

In more detail, although the 'QrxlevminOffset' value is omitted from Equation 3, assuming that a reception level (Srxlev) for cell selection is greater than zero '0' and the handover (HO) condition is satisfied, Equation 3 may be modified into Equation 7.

$$\text{Srxlev}=\text{Qrxlevmeas}-(\text{Qrxlevmin}+\text{Qrxlevminoffset}+\\ \text{QrxlevminoffsetInterRAT})-\text{Pcompensation} \quad \text{[Equation 7]}$$

That is, if 'Srxlev' of Equation 7 is higher than zero '0', the UE may determine that the handover (HO) condition from the eHPRD network to the LTE network is satisfied. Accordingly, if 'Srxlev' of Equation 7 is higher than zero '0', the UE is handed over to the LTE network in step S405. Otherwise, the UE may continuously receive the service through the eHPRD network.

In the above-mentioned HO decision method, the terms 'eHRPD network' and 'LTE network' may be respectively replaced with 'eHRPD BS' and 'LTE BS', or may be respectively replaced with 'eHRPD cell' and 'LTE cell'.

User Equipment (UE) and Base Station (BS) Structures

Now a description will be given of a UE and a BS for implementing the above-described exemplary embodiments of the present invention, according to another exemplary embodiment of the present invention.

The UE may operate as a transmitter on uplink and as a receiver on downlink, while the BS may operate as a receiver on uplink and as a transmitter on downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 5.

Figure 5:
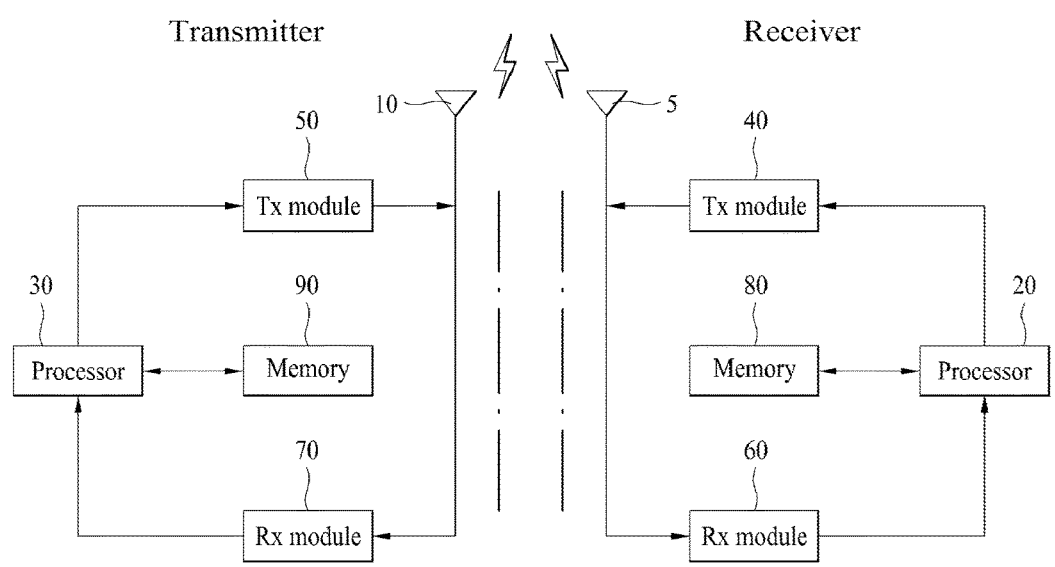
FIG. 5 is a block diagram illustrating a transmitter and a receiver according to another embodiment of the present invention.

FIG. 5 is a block diagram of a transmitter and a receiver according to another exemplary embodiment of the present invention.

Referring to FIG. 5, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are the counter parts of those of the receiver. The components of the transmitter and the receiver will be described below in more detail.

The antennas 5 and 10 include Tx antennas for transmitting signals generated from Tx modules 40 and 50 and Rx antennas for receiving radio frequency (RF) signals and providing the received RF signals to the Rx modules 60 and 70. If Multiple Input Multiple Output (MIMO) is supported, two or more antennas may be provided.

Each of the antenna, the Tx module, and the Rx module may include an RF module therein.

The processors 20 and 30 generally provide overall control to the AMS. Especially, the processors 20 and 30 may perform a controller function for implementing the above-described exemplary embodiments of the present invention, a variable MAC frame control function based on service characteristics and a propagation environment, a handover (HO) function, an authentication and encryption function, etc.

Specifically, upon receiving a service through the eHPRD network, the UE processor searches for a neighbor LTE BS, receives MIB and SIBtype1 information from the searched LTE BS, and determines a handover (HO) condition on the basis of the received information. The UE processor can attempt to perform handover to the LTE network only when the handover (HO) condition is satisfied. In this case, the UE processor receives RxLevminOffsetInterRAT information from the LTE base station (BS), and applies the received RxLevminOffsetInterRAT information to the process for determining whether or not the handover (HO) condition is satisfied, such that the number of unnecessary repeated handover (HO) times can be greatly reduced.

In addition, the LTE BS processor may calculate the RxLevminOffsetInterRAT value using a Qrxlevmin value, a Threshold value and a Hysteresis value, and may inform the UE of the calculated result.

Further, the UE processor may provide overall control to the operations described in the above-mentioned embodiments.

The Tx modules 40 and 50 may encode and modulate transmission data scheduled by the processors 20 and 30 according to a predetermined coding and modulation scheme and provide the modulated data to the antenna 10.

The Rx modules 60 and 70 may recover original data by demodulating and decoding data received through the antennas 5 and 10 and provide the recovered data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The method and apparatus for efficiently performing an inter-RAT handover in a radio access system according to the embodiments of the present invention can be applied to a UE, BS or other devices of wireless communication systems for industrial purposes. In more detail, the above-mentioned embodiments can be applied not only to a method for efficiently performing inter-RAT handover under the situation including two networks having different communication schemes but also to an apparatus for performing or supporting the above method.

The invention claimed is:

1. A method for performing handover in a first-type cell by a user equipment (UE) supporting an inter Radio Access Technology (interRAT) handover (HO) in a radio access system, comprising:

obtaining offset information from a second-type base station configured to use a communication scheme different from that of a first-type base station, the offset information being applied only to the interRAT HO from the first-type base station to the second-type base station; and performing HO to the second-type base station when "Srxlev A" is greater than an offset value indicated by the offset information, wherein the offset value is calculated by subtracting a hysteresis value and "Qrxlevmin" from a threshold value predetermined for an event of a handover from the second-type base station to the first-type base station, and wherein the "Srxlev A" is denoted as Equation A:

$$\text{Srxlev A} = \text{Qrxlevmeas} - (\text{Qrxlevmin} + \text{Qrxlevminoffset}) - \text{Pcompensation}, \quad [\text{Equation A}]$$

where:

"Srxlev A" is a reception level for cell selection for non-interRAT HO,

"Qrxlevmeas" is a signal quality measurement value of the second-type base station, "Qrxlevmin" is a minimum reception signal quality value of the second-type base station, "Qrxlevminoffset" is an offset for correcting the minimum reception signal quality value, and "Pcompensation" is a power compensation constant.

2. The method according to claim 1, further comprising maintaining a service from the first-type base station when the "Srxlev A" is less than or equal to the offset value.

3. The method according to claim 1, further comprising receiving the minimum reception signal quality value from the second-type base station.

4. The method according to claim 1, wherein:

the first-type base station is an enhanced High-Rate Packet Data (eHRPD) base station; and the second-type base station is a Long Term Evolution (LTE) base station.

5. A user equipment (UE) for supporting an inter Radio Access Technology (interRAT) handover (HO) in a radio access system, the UE comprising:

a transmitter and a receiver respectively configured to transmit and receive a signal; and a processor configured to:

obtain offset information from a second-type base station configured to use a communication scheme different from that of the first-type base station, the offset information being applied only to the interRAT HO from the first-type base station to the second-type base station; and perform HO to the second-type BS when "Srxlev A" is greater than an offset value indicated by the offset Information, wherein the offset value is calculated by subtracting a hysteresis value and "Qrxlevmin" from a threshold value predetermined for an event of handover from the second-type base station to the first-type base station, and wherein the "Srxlev A" is denoted as Equation A:

$$\text{Srxlev A} = \text{Qrxlevmeas} - (\text{Qrxlevmin} + \text{Qrxlevminoffset}) - \text{Pcompensation}, \quad [\text{Equation A}]$$

where:

"Srxlev A" is a reception level for cell selection for non-interRAT HO

"Qrxlevmeas" is a signal quality measurement value of the second-type base station, "Qrxlevmin" is a minimum reception signal quality value of the second-type base station, "Qrxlevminoffset" is an offset for correcting the minimum reception signal quality value, and "Pcompensation" is a power compensation constant.

6. The UE according to claim 5, wherein the processor is further configured to maintain a service from the first-type base station when the "Srxlev A" is less than equal to the offset value.

7. The UE according to claim 5, wherein the processor is further configured to receive the minimum reception signal quality value from the second-type base station.

8. The UE according to claim 5, wherein:
the first-type base station is an enhanced High-Rate Packet Data (eHRPD) base station; and
the second-type base station is a Long Term Evolution (LTE) base station.

* * * * *